US006920229B2

(12) United States Patent
Boesen (10) Patent No.: US 6,920,229 B2
(45) Date of Patent: Jul. 19, 2005

(54) EARPIECE WITH AN INERTIAL SENSOR (76) Inventor: Peter V. Boesen, 4026 Beaver Ave., Des Moines, IA (US) 50310

( * ) Notice: Subject to any disclaimer, the term of this patent is extended or adjusted under 35 U.S.C. 154(b) by 73 days.

(21) Appl. No.: 10/236,196

(22) Filed: Sep. 6, 2002

(65) Prior Publication Data
US 2003/0002705 A1 Jan. 2, 2003

Related U.S. Application Data (63) Continuation-in-part of application No. 10/134,239, filed on Apr. 29, 2002, which is a continuation of application No. 09/587,743, filed on Jun. 5, 2000, now Pat. No. 6,408,081, which is a continuation of application No. 09/309,107, filed on May 10, 1999, now Pat. No. 6,094,492.

(51) Int. Cl.[7] .............................................. H04R 25/00
(52) U.S. Cl. ........................ 381/380; 381/326; 340/575
(58) Field of Search ................................. 381/326, 328, 381/380, 312, 315, 322; 340/575, 576

(56) References Cited

U.S. PATENT DOCUMENTS

| 3,947,815 A | * | 3/1976 | Muncheryan | ............... | 340/575 |
|---|---|---|---|---|---|
| 3,999,177 A | * | 12/1976 | Greene | ........................ | 340/575 |
| 4,150,262 A | | 4/1979 | Ono | | |
| 4,297,685 A | * | 10/1981 | Brainard, II | ................. | 340/575 |
| 4,334,315 A | | 6/1982 | Ono et al. | | |
| 4,374,382 A | | 2/1983 | Markowitz | | |
| 4,588,867 A | | 5/1986 | Konomi | | |
| 4,654,883 A | | 3/1987 | Iwata | | |
| 4,791,673 A | | 12/1988 | Schreiber | | |
| 4,854,328 A | | 8/1989 | Pollack | | |
| 4,865,044 A | | 9/1989 | Wallace et al. | | |
| 4,981,139 A | | 1/1991 | Pfohl | | |
| 5,010,890 A | | 4/1991 | Pfohl et al. | | |
| 5,280,245 A | | 1/1994 | Norris | | |
| 5,295,193 A | | 3/1994 | Ono | | |
| 5,298,692 A | | 3/1994 | Ikeda et al. | | |
| 5,343,532 A | | 8/1994 | Shugart, III | | |
| 5,349,863 A | | 9/1994 | Dumont et al. | | |
| 5,613,222 A | | 3/1997 | Guenther | | |
| 5,634,468 A | | 6/1997 | Platt et al. | | |
| 5,692,059 A | | 11/1997 | Kruger | | |
| 5,721,783 A | * | 2/1998 | Anderson | .................... | 381/328 |
| 5,749,072 A | | 5/1998 | Mazurkiewicz | | |
| 5,802,167 A | | 9/1998 | Hong | | |
| 5,841,354 A | * | 11/1998 | Bae et al. | .................... | 340/575 |
| 5,898,908 A | | 4/1999 | Griffin et al. | | |
| 5,987,146 A | | 11/1999 | Pluvinage et al. | | |
| 6,021,207 A | | 2/2000 | Puthuff et al. | | |
| 6,048,324 A | | 4/2000 | Socci et al. | | |
| 6,067,020 A | * | 5/2000 | Wimmer | ...................... | 340/575 |
| 6,091,334 A | * | 7/2000 | Galiana et al. | ............. | 340/576 |
| 6,094,492 A | | 7/2000 | Boesen | | |

(Continued)

FOREIGN PATENT DOCUMENTS

| EP | 0 671 115 B1 | | 9/1995 | | |
|---|---|---|---|---|---|
| EP | 0 683 621 A2 | | 11/1995 | | |
| GB | 2 074 817 A | | 4/1981 | | |
| JP | 08037041 | * | 1/1996 | ........... | G08B/21/00 |

OTHER PUBLICATIONS

Bluetooth, "The Ultimate Headset", Jun. 26, 2000.
Airmagic, "Wireless Headset User's Guide".

*Primary Examiner*—Curtis Kuntz
*Assistant Examiner*—Brian Ensey
(74) *Attorney, Agent, or Firm*—McKee, Voorhees & Sease, P.L.C.

(57) ABSTRACT

A communication device includes an earpiece housing adapted for fitting to an ear of a user such that the earpiece does not block the canal, an inertial sensor operatively connected to the earpiece housing for sensing positional changes of the user's ears, a processor operatively connected to the inertial sensor and disposed within the earpiece determining presence of an alert condition at least partially based on positional changes, and a speaker operatively connected to the processor.

38 Claims, 9 Drawing Sheets

U.S. PATENT DOCUMENTS

| | | |
|---|---|---|
| 6,112,103 A | 8/2000 | Puthuff |
| 6,113,539 A | 9/2000 | Ridenour |
| 6,137,889 A | 10/2000 | Shennib et al. |
| 6,181,801 B1 | 1/2001 | Puthuff et al. |
| 6,230,029 B1 | 5/2001 | Hahn et al. |
| 6,272,227 B1 | 8/2001 | Yanagisawa |
| 6,315,074 B1 | 11/2001 | Achhammer et al. |
| 2003/0107489 A1 * | 6/2003 | Li ............................... 340/575 |

* cited by examiner

EARPIECE WITH AN INERTIAL SENSOR

PRIORITY STATEMENT

This application is a continuation-in-part of U.S. Ser. No. 10/134,239, filed on Apr. 29, 2002, which is a continuation of U.S. Ser. No. 09/587,743, filed Jun. 5, 2000 which issued as U.S. Pat. No. 6,408,081 which is a continuation of U.S. Ser. No. 09/309,107, filed May 10, 1999 which issued as U.S. Pat. No. 6,094,492.

BACKGROUND OF THE INVENTION

The present invention relates to an earpiece with an inertial sensor. Portions of the earpiece of the present invention are described in U.S. Pat. No. 6,094,492, herein incorporated by reference in its entirety.

Knowledge of a user's head position can be used for various purposes. One such purpose is to determine whether a person has nodded off and fallen asleep. One example of such a device is found in U.S. Pat. No. 6,048,324 to Socci et al. Socci uses head gear to sense movement of a user's head.

Nevertheless, problems remain. In particular, a specialized head gear apparatus can be inconvenient and unwielding. A head gear apparatus can also be very conspicuous in appearance. What is needed is an unobtrusive way to monitor head movements and communicate information regarding head movements.

Therefore, it is a primary object, feature or advantage of the present invention to improve upon the state of the art.

It is a further object, feature or advantage of the present invention to provide for an earpiece capable of determining positional changes.

Another object of the present invention is to provide for an earpiece that is capable of associating positional changes with the occurrence of particular events.

These and/or other objects, features or advantages of the present invention will become apparent from the specification and claims.

SUMMARY OF THE INVENTION

The present invention provides for a communication device having an earpiece housing adapted for fitting to an ear of the user. An inertial sensor is operatively connected to the earpiece housing for sensing positional changes of the user's ear. A processor is operatively connected to the inertial sensor and disposed within the earpiece for determining the presence of an alert condition at least partially based on positional changes. A speaker is also operatively connected to the processor.

The present invention provides the advantages of producing an audible alert using the processor and the speaker. The audible alert is produced when the inertial sensor detects a positional change that the processor associates with an alert condition. For example, the inertial sensor can be associated with the nodding of the head such as occurs during sleeping such that when this positional change occurs, an audible sound is produced thereby waking the user up. One example of an application of the device is to wake a user up who is wearing the earpiece who, while driving, begins to nod off.

DETAILED DESCRIPTION OF THE DRAWINGS

The present invention provides for an earpiece with an inertial sensor that is adapted to produce an audible alert that can be based upon inertial changes detected by the inertial sensor.

FIGS. 1A–D illustrate pictorial representations of a user wearing an earpiece according to the present invention. The earpiece 10 is associated with an ear 12. Although the earpiece 10 is shown on the left ear of an individual, the present invention contemplates that the device can function on either ear.

Figure 1A:
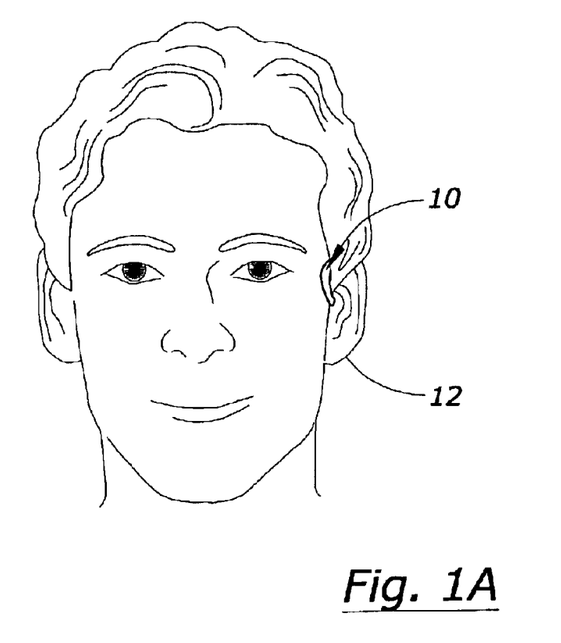
FIG. 1A is a pictorial representation of a user wearing the earpiece when their head is in an upright position.
Figure 1B:
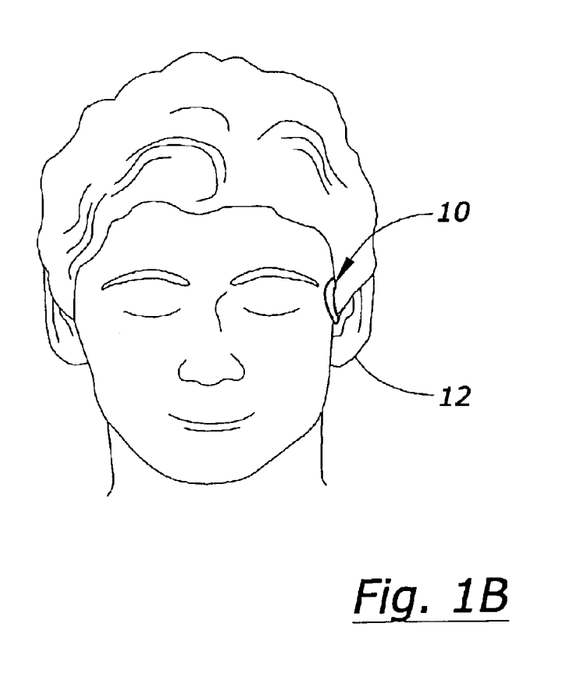
FIG. 1B is a pictorial representation of a user wearing the earpiece when their head is nodded to a downward position.
Figure 1C:
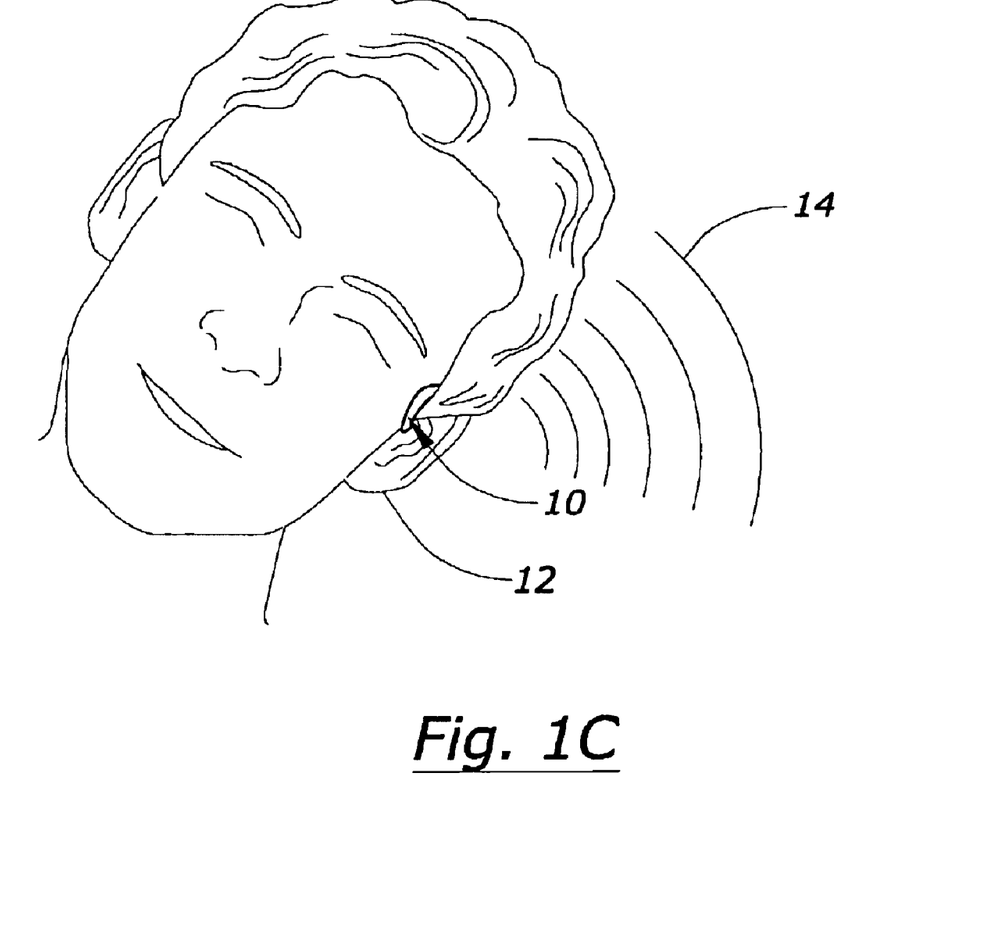
FIG. 1C is a pictorial representation of a user wearing the earpiece when their head is positioned in a sideways position.
Figure 1D:
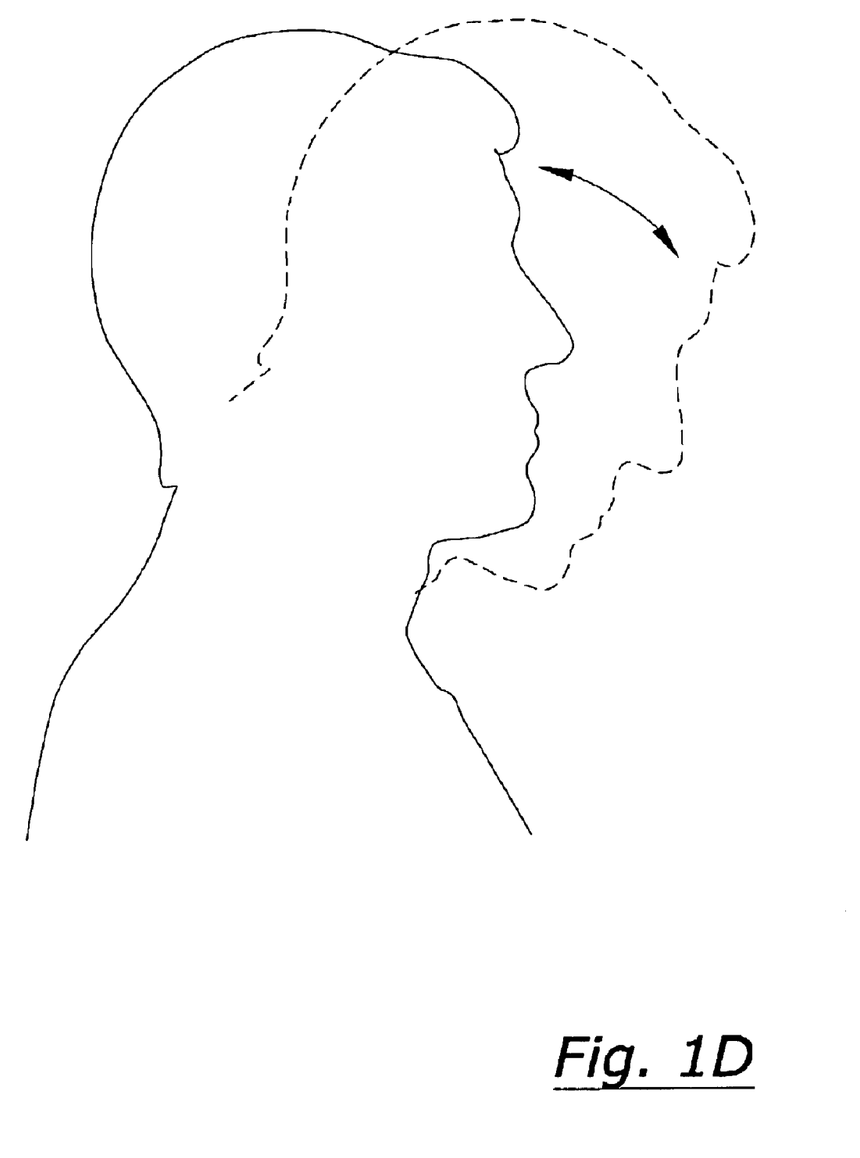
FIG. 1D is a pictorial representation of a user with their head moving downward.

In FIG. 1A, the user is in an alert and aware position. In FIG. 1B, the user has begun to nod such as is associated with a user falling asleep. When the user falls asleep, an audible alert occurs that is preferably of sufficient volume to wake the user up. The present invention contemplates that inertial changes can be monitored on a single axis or multiple axes. FIG. 1C shows a user whose head is tilted to the side and downward which is along a different axis than in FIG. 1B. As shown in FIG. 1C, the audible alert 14 is produced which preferably is of sufficient volume to wake the user up. FIG. 1D illustrates inertial head movement of the user.

The present invention contemplates variations in the manner in which the position or movement of a users head is associated with the user falling asleep. For example, when a user moves their head in a short and controlled manner, this motion need not be associated with the user falling asleep. Such motion can be associated with the user affirmatively nodding their head. The present invention contemplates distinguishing between the movement of a users head when the user is falling asleep and the movement of a users head when the user is consciously controlling the movement of their head. The present invention contemplates this distinction can be made based upon the direction of the motion over time. For example, head movement may involve more oscillation before coming to rest in a downward position when a user is falling asleep. Similarly, the user's head may move side to side as well as downward before the user falls asleep.

Figure 2A:
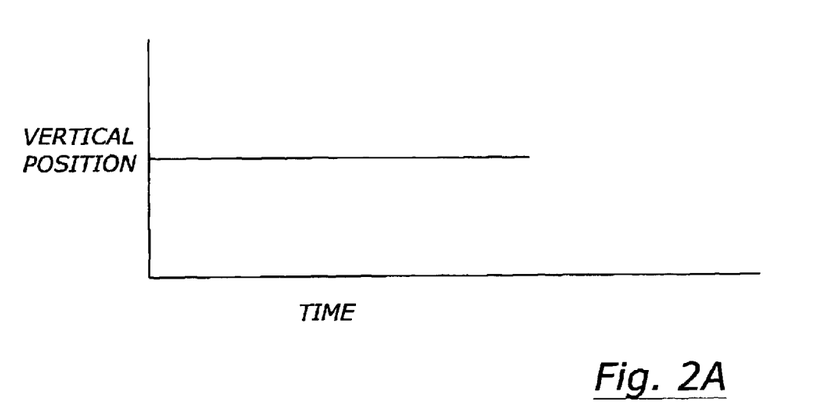
FIGS. 2A–2C provide graphs of head motion over time.
Figure 2B:
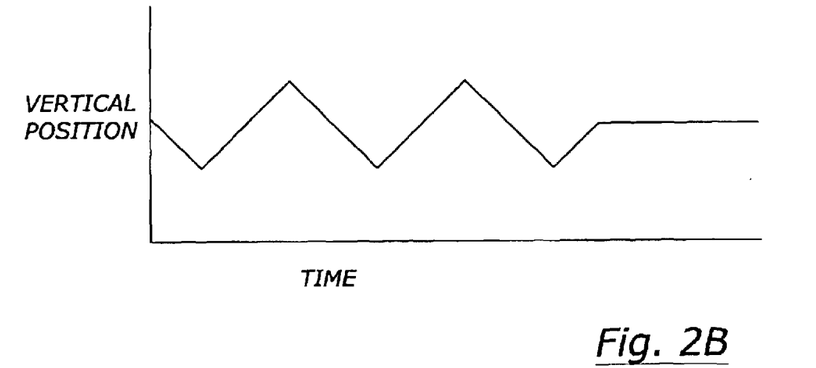
Figure 2C:
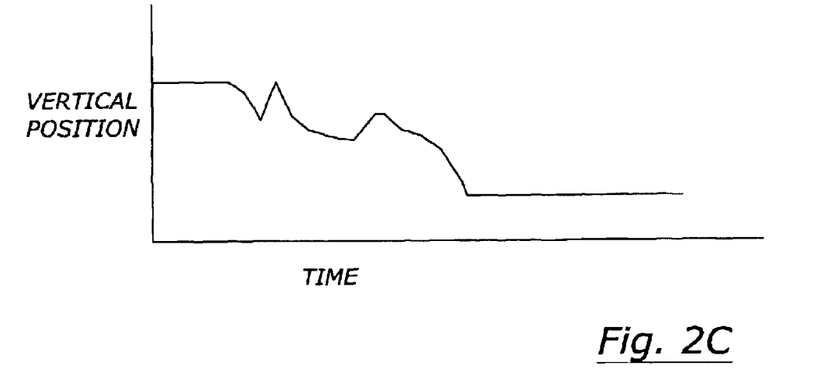

FIGS. 2A–2C provide graphs illustrative of head position over time. In FIG. 2A, a user maintains their head in a constant horizontal position. In FIG. 2B, movement of the head is shown over time. The motion of the head can be associated with controlled head movement such as when a person nods their head up or down affirmatively. FIG. 2C provides a graph of head movement over time that can be associated with a use nodding off. In FIG. 2C a user gradually nods their head, catches themselves momentarily, continues to gradually nod their head, catches themselves momentarily and slightly, and then nods off. The present invention provides for distinguishing between conscious head movements and nodding off in various ways, including the time associated with a particular head movement, the speed of a head movement, the size of a head movement, the regularity or eradicness of a head movement and other variations. Although, the graphs of FIGS. 2A–2C are only two-dimensional in nature, the present invention contemplates that additional more complex relationships and indicators can be monitored to determine when a user is falling asleep. That which is shown is merely illustrative.

Figure 3:
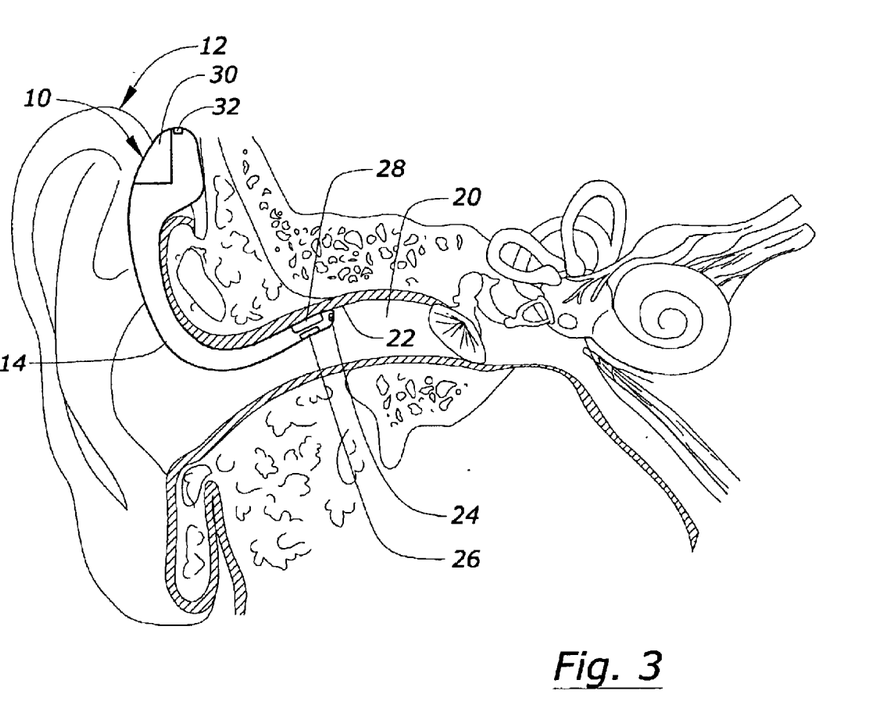
FIG. 3 is a diagram of the earpiece as adapted for fitting to an ear according to one embodiment of the present invention.

FIG. 3 provides an illustration of the one embodiment of the earpiece 10 fitted to an ear. Although a Behind The Ear (BTE) earpiece is shown, the present invention contemplates that a Completely In Canal (CIC) or otherwise configured earpiece can also be used to the present invention.

The earpiece 10 extends into the external auditory canal 20 of a user and fits against the canal wall 22. Although this design implementation is preferred, the present invention contemplates that the earpiece need not extend fully into the external auditory canal, or need not extend into the external auditory canal in the same manner. As shown, and as is preferable, the earpiece 10 does not occlude the external auditory canal 20. This allows the user to continue to hear sounds from the environment, when the earpiece is in place and makes the earpiece more comfortable to wear.

The earpiece 10 includes an earpiece housing 14. The earpiece housing 14 is preferably lightweight and can be flexible. An air conduction sensor 26 and a bone conduction sensor 28 are also shown. The air conduction sensor 26 can be an ear microphone or other type of sensing device. The bone conduction sensor 28 can be an accelerometer or other bone conduction sensing device that can be used to sense voice sound vibrations.

An inertial sensor 30 is also shown. An inertial sensor senses either acceleration, velocity, or other characteristics of changes in position. The inertial sensor 30 can be an accelerometer, a gyrometer, or other type of inertial sensor or combination thereof. Where the inertial sensor 30 is an accelerometer, the present invention contemplates that the inertial sensor 30 can be a linear accelerometer, a multiple axis accelerometer, or other accelerometer such as may be appropriate for a particular design or an application.

An antenna 32 is also shown that can be used to transmit and receive a signal from a transceiver within the earpiece housing 14. The antenna can be either external or internal to the earpiece.

Figure 4:
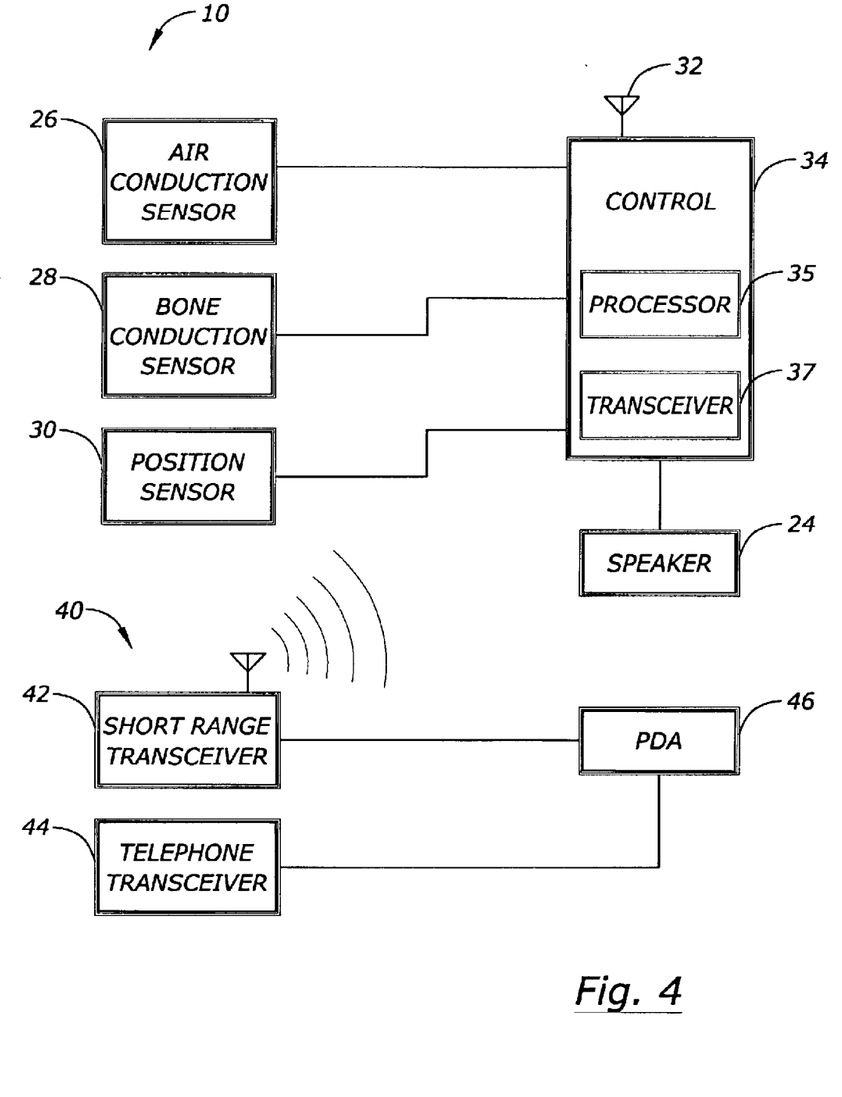
FIG. 4 is a block diagram showing one embodiment of the present invention.

FIG. 4 provides a block diagram of one embodiment of a voice communication earpiece 10 of the present invention. The system includes an air conduction sensor 26, a bone conduction sensor 28, and an inertial sensor 30. Each of the sensors 26, 28, and 30 are electrically connected to a control unit 34 that preferably includes a processor 35 and a transceiver 37. The control unit 34 is also electrically connected to a speaker 24.

The control unit 34 is preferably disposed within the earpiece 10. The processor 35 is adapted for determining the presence of an alert condition at least partially based on positional changes detected by the inertial sensor 30.

The control unit 34 can take various forms or configurations. For example, the control unit 34 includes a single chip containing a processor 35 and a transceiver 37. One example of such a chip is the Blue Core-2-ROM single chip Bluetooth system available from CSR. The present invention, however, contemplates that the processor 35 and the transceiver 37 need not be integrated on a single chip. Further, the present invention is in no way limited to the Bluetooth wireless standard or any particular wireless standard or protocol.

The present invention also contemplates that the voice communication device 10 may be in communication with a remote unit 40 that includes a short range transceiver 42 and a telephone transceiver 44 such as a cellular telephone that can also be electrically connected to a PDA 46. The present invention contemplates that the telephone transceiver 44 and the PDA 46 can be integrated such as in a smartphone or similar device. Instead of a PDA, the present invention contemplates that a computer associated with a car can also be used.

Figure 5:
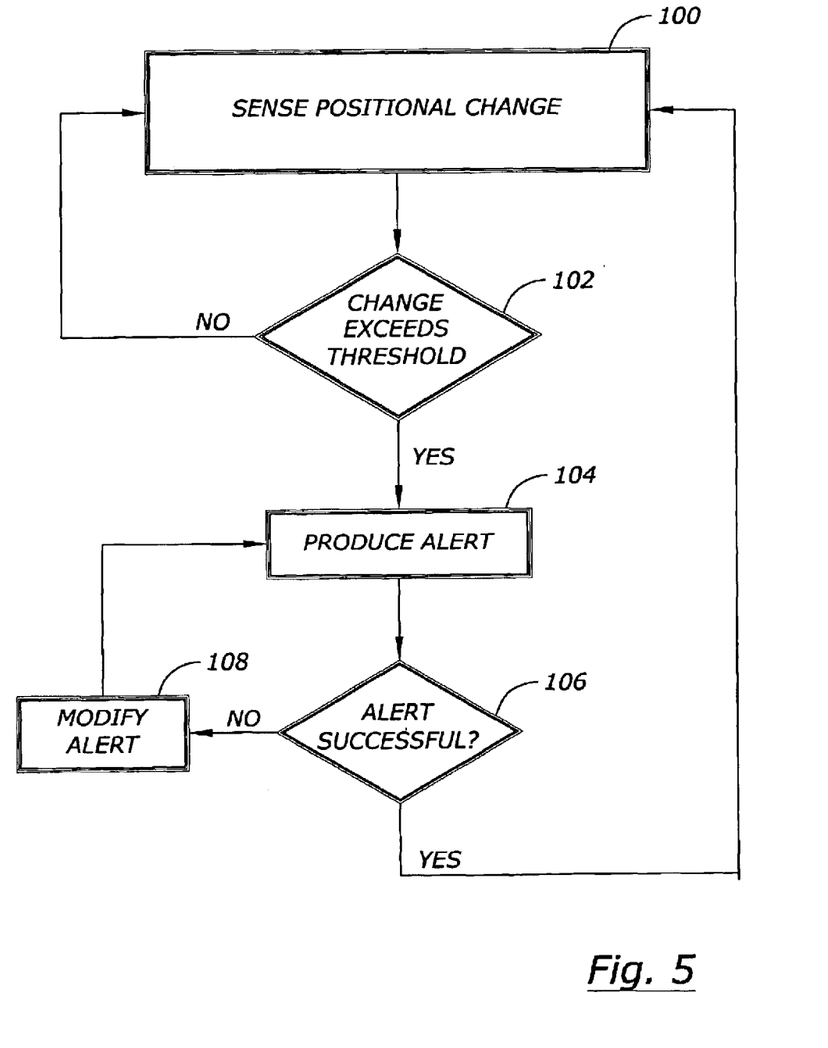
FIG. 5 is a flow diagram showing one embodiment of a method according to the present invention.

FIG. 5 provides a flow diagram of one method of the present invention. In step 100 a positional or inertial change is sensed. This change can be caused by movement of the head. In step 102 a determination is made by the processor 35 or the control unit 34 that the sensed positional change exceeds a particular threshold. If the positional change does not exceed the threshold then there is no need for an alert and the next positional change is sensed in step 100. If, however, the positional change sensed exceeds a threshold in step 102, then in step 104 an alert is produced. This alert can be produced by the processor 35 and the speaker 24. Preferably the alert is an audible alert or vibration. To create a vibration alert, the present invention provides for backdriving the bone conduction sensor to produce a vibrating alert, or producing a low frequency signal of the speaker. In step 106, positional changes are again monitored in order to determine if the alert was successful. For example, if the head returned to an upright position, then the alert was successful. If, however, there was no positional change or an insufficient positional change sensed after the alert, then in step 108 the alert is modified and in step 104 a new alert is produced.

The present invention also contemplates that the occurrence of the alert condition can be communicated remotely using the transceiver 37. For example, the short-range transceiver 42 receives notification of the alert condition and can communicate it to the PDA 46. The PDA 46 can store the notification or further communicate notification of the alert condition through the telephone transceiver 44.

The present invention contemplates numerous ways of modifying the alert. For example, the alert can be a longer audible alert, the alert can be of increased volume, the alert can be of different tone, or other changes in the alert can be made as may be appropriate in a particular application.

According to one embodiment of the methodology of the present invention, a user can activate the head movement monitoring of the device either through voice activation or otherwise. For example, a person who is driving late at night who is tired could activate the alert function of the present invention. Alternatively, the present invention contemplates that monitoring head movement can be automatically activated. For example, when used in conjunction with a car computer, the present invention contemplates that monitoring can always take place when the user is in the car. The present invention also contemplates that a temperature sensor in the earpiece can be used to determine whether or not the user is actually wearing the earpiece. In such an embodiment, the temperature sensed would be expected to be at or near the core body temperature. If the temperature sensed was instead at or near an ambient temperature, then it is known that the user is not wearing the earpiece and thus the head movement monitoring aspect of the invention should not be active.

The methodology of the present invention further contemplates particular variations best-suited for use when driving a vehicle. For example, the present invention contemplates that in addition to providing an audio alert, the present invention can communicate the occurrence of the alert to a PDA, computer, or other computing device. The computing device can then take appropriate additional action. For example, where the computer is in a car equipped with a GPS device and mapping the system, the present invention contemplates identifying nearby interstate or highway exits, nearby rest stops, lodging, or other areas of interest in order to assist the driver in getting off of the road if necessary. The present invention contemplates that such information can be received through a telephone transceiver or other communications device that is operatively connected to the computer in the car or a PDA. Alternatively, databases of such information can be stored locally. Where a communications device is available, the present invention contemplates that additional actions such as contacting a motel to request a reservation.

The present invention further contemplates that instead of merely relying on a speaker within the earpiece, the car audio system can also be used. Music can be played, loud or annoying tones can be produced and other appropriate actions can be taken until the appropriate feedback is received from the driver/operator. The driver/operator could provide the feedback through touching a button on a screen or on the dashboard or audibly giving a code word once or repeatedly. The present invention contemplates that many different types of feedback could be used. Another example is that the ear piece can provide for tactile feedback by vibrating the ear through backdriving the bone conduction sensor or through a low frequency signal at the speaker.

Figure 6:
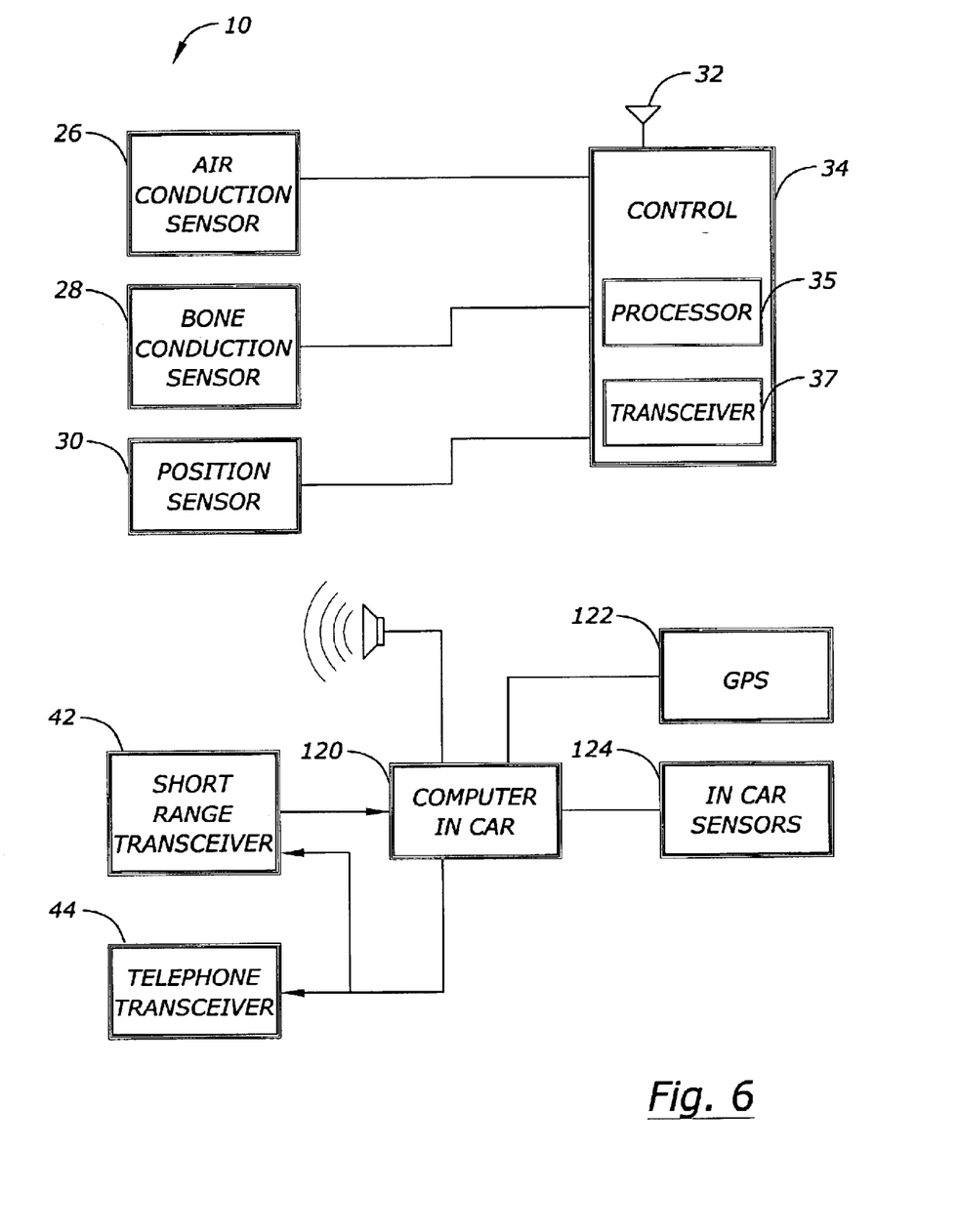
FIG. 6 is a block diagram showing another embodiment of the invention wherein an earpiece is communication with a computer of a car.

FIG. 6 illustrates one embodiment of the present invention where there is a voice communication device 10 such as an ear piece. The earpiece can include one or more sensors such as an air conduction sensor 26, a bone conduction sensor 28, and a position sensor 30. Each of the sensors is electrically connected to a control unit 34 that includes aprocessor 35 and a transceiver 37. The ear piece unit 10 is in communication with a remote unit that has a short range transceiver 42 for short range communications and a telephone transceiver 44 for voice communications. The short range transceiver 42 and telephone transceiver 44 are operatively connected to a computing device such as a computer 120 within the car. The present invention contemplates that various vehicle functions and features are controlled by the computer 120 within the car. For example, there may be a GPS unit 122 electrically connected to the computer 120 as well as in car sensors 124. The present invention further contemplates that computer 120 within the car can control a display within the car, a sound system of the car, windows of the car, airconditioning within the car, or any number of vehicle functions. The computer 120 within the car can control any of these functions in order to alert the user of the occurrence of an alert condition.

Figure 7:
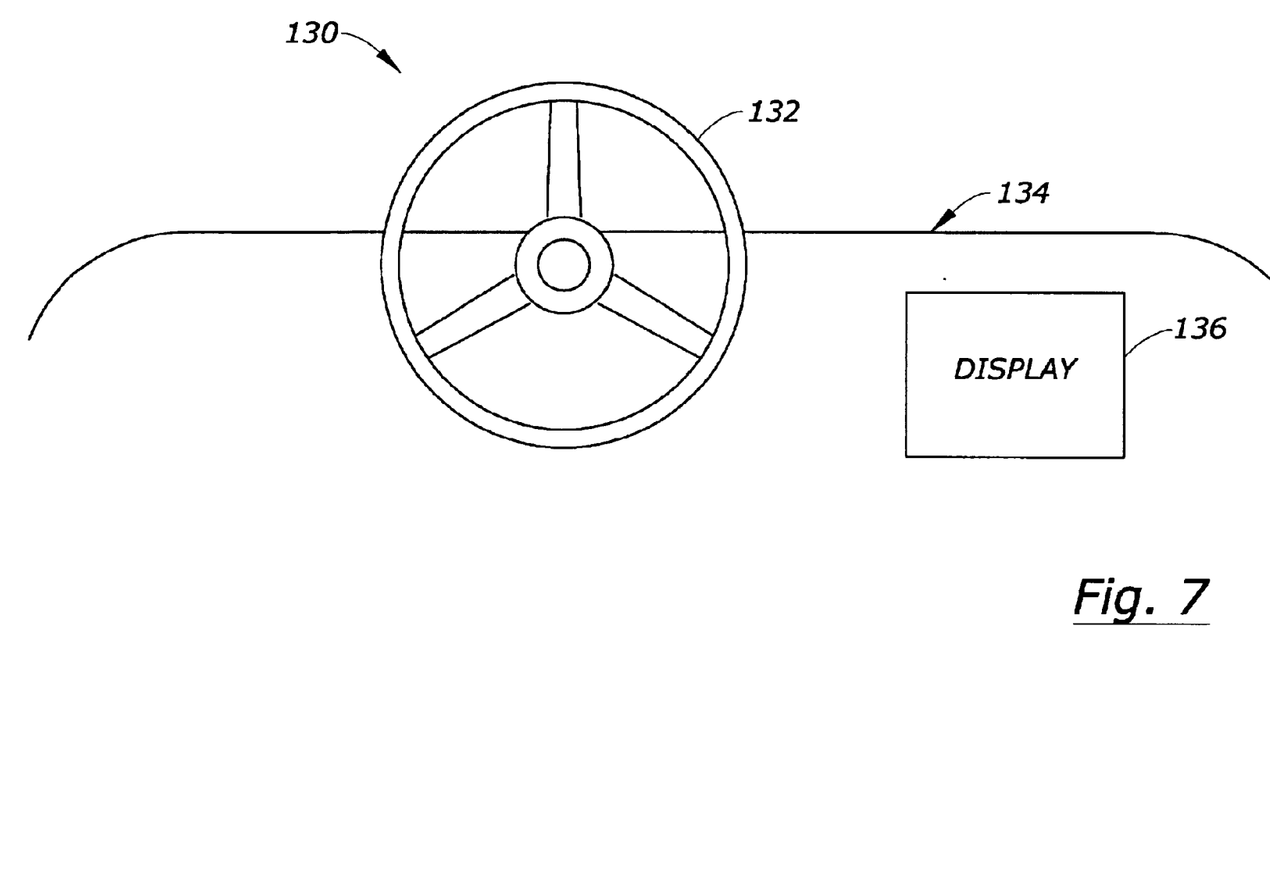
FIG. 7 is a pictorial representation showing a car adapted for use with the present invention.

FIG. 7 illustrates a car 130 with a steering wheel 132, a dashboard 134 and a display 136. The display 136 can be used in conjunction with a GPS unit to provide for mapping of the location of the car 130 and to provide directions. The present invention contemplates that other types of vehicle input and output devices can be used to provide information to the user or to receive feedback that a user has received notification of an alert condition.

Therefore, an earpiece with an inertial sensor has been disclosed. The earpiece and its accompanying method of use can be used in various applications and environments. The present invention contemplates variations in the particular components used, placement of the components, and other variations which are within the spirit and scope of the invention.

What is claimed is:

1. A communication device, comprising:
   an earpiece adapted for fitting to an ear of a user such that the earpiece does not block an external auditory canal of the ear of the user canal;
   an inertial sensor operatively connected to the earpiece for sensing positional changes;
   a processor operatively connected to the inertial sensor and disposed within the earpiece and adapted for determining presence of an alert condition based on earpiece movement associated with a sleep pattern movement over time; and
   a speaker operatively connected to the processor for producing audible alert.

2. The communication device of claim 1 further comprising a transceiver operatively connected to the processor.

3. The communication device of claim 1 further comprising a sensor operatively connected to the earpiece housing for sensing voice sound information.

4. The communication device of claim 3 wherein the sensor is an air conduction sensor.

5. The communication device of claim 3 wherein the sensor is a bone conduction sensor.

6. The communication device of claim 1 further comprising a plurality of sensors operatively connected to the earpiece housing for sensing voice sound information.

7. The communication device of claim 6 wherein at least one of the sensors is a bone conduction sensor.

8. The communication device of claim 6 wherein at least one of the sensors is an air conduction sensor.

9. The communication device of claim 1 wherein the alert condition is associated with the user falling asleep.

10. The communication device of claim 1 wherein the alert condition is associated with nodding.

11. The communication device of claim 1 wherein the processor is electrically connected to the speaker and the processor is adapted to produce the audible alert upon occurrence of the alert condition.

12. The communication device of claim 1 wherein the inertial sensor is a gyrometer.

13. The communication device of claim 1 wherein the inertial sensor is an accelerometer.

14. A method of alerting a user, comprising:
   sensing a physical movement with a sensor operatively connected to an earpiece;
   processing the sensed physical movement to determine presence of an alert condition using a processor disposed within the earpiece wherein the presence of the alert condition is associated with a sleep pattern movement;
   producing an audible alert after occurrence of the alert condition of the earpiece using a speaker operatively connected to the processor.

15. The method of claim 14 wherein the physical movement is a positional change of the sensor.

16. The method of claim 14 wherein the mien condition is associated with the user falling asleep.

17. The method of claim 14 wherein the sensor is a gyrometer.

18. The method of claim 14 wherein the sensor is an accelerometer.

19. The method of claim 14 further comprising transmitting notification of the alert condition from the earpiece using a wireless transceiver of the earpiece.

20. The method of claim 14 further comprising determining whether the user is wearing the earpiece by sensing a temperature associated with the earpiece.

21. A communication device, comprising:
an earpiece housing adapted for fitting to an ear of a user;
an inertial sensor disposed within the earpiece housing for sensing physical movement;
a processor operatively connected to the inertial sensor and disposed within the earpiece for determining if physical movement over time is associated with a sleep pattern movement;
a speaker operatively connected to the processor;
a sensor operatively connected to the processor for sensing voice sound information; and
a transceiver operatively connected to the processor.

22. The communication device of claim 21 wherein the inertial sensor is an accelerometer.

23. The communication device of claim 21 wherein the inertial sensor is a gyrometer.

24. The communication device of claim 21 wherein the processor is further adapted to produce an audible alert on the speaker upon occurrence of the alert condition.

25. A communication device, comprising:
an earpiece housing adapted for fitting to an ear of a user;
an inertial sensor operatively connected to the earpiece housing for sensing physical movement;
a processor operatively connected to the inertial sensor and disposed within the earpiece, the processor adapted to characterize the physical movement based on the direction of the physical movement over time and determine if the physical movement is indicative of a sleep pattern; and
a speaker operatively connected to the processor.

26. A method of alerting a user, comprising:
sensing a physical movement with a sensor operatively connected to an earpiece; and
processing the sensed physical movement to determine presence of an alert condition based on sensed physical movement over time and correspondence of the sensed physical movement with a sleep pattern using a processor disposed within the earpiece.

27. The method of claim 26 further comprising producing an audible alert after occurrence of the alert condition using a speaker disposed within the earpiece.

28. The method of claim 26 further comprising producing a vibrating alert by backdriving a bone conduction sensor within the earpiece.

29. The method of claim 27 further comprising receiving feedback that the user has responded to the audible alert.

30. The method of claim 26 further comprising receiving feedback from the user to indicate the user is aware of the alert condition.

31. The method of claim 26 further comprising transmitting the occurrence of the alert condition from the earpiece to a computing device.

32. The method of claim 31 further comprising determining a location of potential interest and directing the user to the location of potential interest.

33. The method of claim 32 wherein the location of potential interest is selected from the set comprising an exit, a hotel, a motel, and a rest area.

34. The method of claim 32 further comprising making a reservation at the location of potential interest.

35. The method of claim 32 wherein the step of directing the user to the location includes displaying a map.

36. The method of claim 31 wherein the computing device is operatively connected to a vehicle and further comprising notifying the user of the presence or the alert condition through use of a feature of the vehicle.

37. The method of claim 36 wherein the feature of the vehicle is a sound system of the vehicle.

38. A method of alerting a user, comprising:
sensing a physical movement with a sensor operatively connected to an earpiece;
processing the sensed physical movement to determine if the sensed physical movement represents a sleep pattern indicating presence of an alert condition using a processor disposed within the earpiece; and
producing a vibrating alert by back driving a bone conduction sensor within the earpiece.

* * * * *